United States Patent [19]

Yamanaka

[11] 4,130,356
[45] Dec. 19, 1978

[54] CAMERA WITH BUILT-IN FLASH DEVICE

[75] Inventor: Akira Yamanaka, Sakai, Japan

[73] Assignee: Minolta Camera Kabushiki Kaisha, Osaka, Japan

[21] Appl. No.: 842,763

[22] Filed: Oct. 17, 1977

[30] Foreign Application Priority Data

Oct. 26, 1976 [JP] Japan ........................... 51-143126[U]

[51] Int. Cl.² ............................................. G03B 15/03
[52] U.S. Cl. ................................................. 354/145
[58] Field of Search ......................... 354/126, 145, 149

[56] References Cited

U.S. PATENT DOCUMENTS

| | | | |
|---|---|---|---|
| 2,967,469 | 1/1961 | Lachaize | 354/149 |
| 3,260,181 | 7/1966 | Hennig et al. | 354/149 |
| 3,273,479 | 9/1966 | Jakob | 354/149 |
| 3,598,031 | 8/1971 | Harvey | 354/149 |
| 4,045,808 | 8/1977 | King | 354/126 |

FOREIGN PATENT DOCUMENTS 2535972   2/1976   Fed. Rep. of Germany ........... 354/145

*Primary Examiner*—Donald A. Griffin
*Attorney, Agent, or Firm*—Wolder, Gross & Yavner

[57] ABSTRACT

A camera built-in flash device is movable between a retracted rest position where the light emitting portion of the device is within the contour of the camera body, and an extended operative position where the flash emitting portion projects beyond the camera contour a distance from the optical axis of the camera objective sufficient to avoid the red-eye phenomenon. A mechanism for transferring the flash device from the rest to the operative position includes a first member movable a predetermined distance relative to the camera body, a second member movable a predetermined distance relative to the first member and means for interconnecting these two members to move the flash device a distance equal to the sum of distances of movement of the members. The flash device is releasably retained at the rest and operative positions.

7 Claims, 5 Drawing Figures

CAMERA WITH BUILT-IN FLASH DEVICE

BACKGROUND OF THE INVENTION

The present invention relates generally to improvements in cameras equipped with flash devices, and it relates more particularly to an improved camera having a self-contained flash unit transferrable between retracted and extended positions.

In a camera equipped with a flash device, if an attempt is made to reduce the volume of the camera to a compact size, then the light-emitting portion of the flash device must be positioned in the close vicinity of the objective lens of the camera.

However, it is well known that when flash photography is performed with the light emitting portion of the flash device being positioned close to the objective lens, there then occurs the so called "red-eye" phenomenon, in which the eyes of a person being photographed are red in the resulting picture.

Many attempts have been proposed to prevent the "red-eye" phenomenon. A simple practice among these is that the light emitting portion of the flash device is spaced at least a given distance from the objective lens of the camera for preventing the "red-eye" phenomenon. The structure employed includes the so called pop-up system, in which a flash device is provided in a manner to be retracted into or extended out beyond the contour of the camera body, and thus the flash device is brought from its retracted position within the camera to its extended position upon taking a flash photograph, so that the light emitting portion of the flash device may be operated in as far a position from the objective lens of the camera as possible.

The pop-up system may be classified into two types, i.e., one in which the flash device including the light emitting portion is exposed out of the contour of the camera at its front, even in the case where the flash device assumes its extended position, and another in which the flash device including the light emitting portion may be completely retracted within the contour of a camera. From the viewpoint of the projection of the flash device, particularly the protection of its light emitting portion, the latter is superior to the former. However, the latter poses the problems that a large space is required for the flash device, as well as for its extending mechanism relative to the volume of the camera body. On the other hand, due to the limitations imposed by various camera mechanisms disposed within a camera body, for instance, the patrone chamber, and film take-up and rewinding mechanisms, difficulties are encountered with the provision of a long stroke of a mechanism which advances the light emitting portion to its extended position. Even if these limitations are eliminated, it is still difficult to provide for the aforesaid mechanism a stroke greater in dimension than the height of the contour of the camera.

In other words, it is difficult however in the latter type of retractable advanceable flash device mechanism to provide a sufficiently long stroke for bringing the light emitting portion of the flash device to an extended position which is spaced from the objective lens a distance adequate to avoid the "red-eye" phenomenon.

SUMMARY OF THE INVENTION

It is therefore an object of the present invention to provide an improved camera equipped with an extendable flash device, which avoids the shortcomings experienced with the earlier devices of the subject type and insures that the extended position of the light emitting portion of the flash device is sufficiently spaced from the camera objective lens to obviate the "red-eye" phenomenon without increasing the volume of the camera.

The above and other objects of the present invention will become apparent from a reading of the following description taken in conjunction with the accompanying drawings which illustrate preferred embodiments thereof.

According to the present invention, there is provided a camera equipped with an extendable-retractable flash device, in which the retracting and extending operations of the light emitting portion of the flash device is carried out in two steps, so that despite the short stroke of each step, the flash device light emitting portion in its extended position is spaced a sufficient distance from an objective lens to avoid the "red-eye" phenomenon.

BRIEF DESCRIPTION OF THE DRAWINGS

FIGS. 3(A) and 3(B) are front elevational views showing the moving sequence of the light emitting portion in the embodiment of FIG. 2, in which FIG. 3(A) shows the light emitting portion partially advanced with a first sliding rod moved from its retracted position to its extended position, and FIG. 3(B) shows the light emitting portion fully extended with a second sliding rod moved from its folded position in the first sliding rod, to its extending position for flash photography.

DESCRIPTION OF THE PREFERRED EMBODIMENTS

Figure 1:
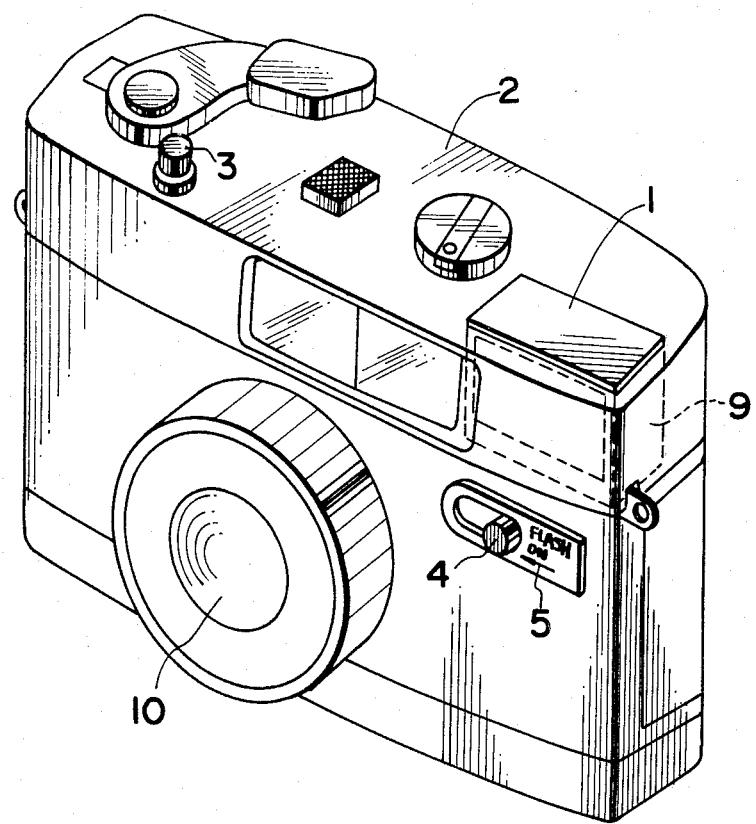
FIG. 1 is a front perspective view of a camera according to one embodiment of the present invention, the light emitting portion being shown in retracted position.
Figure 2:
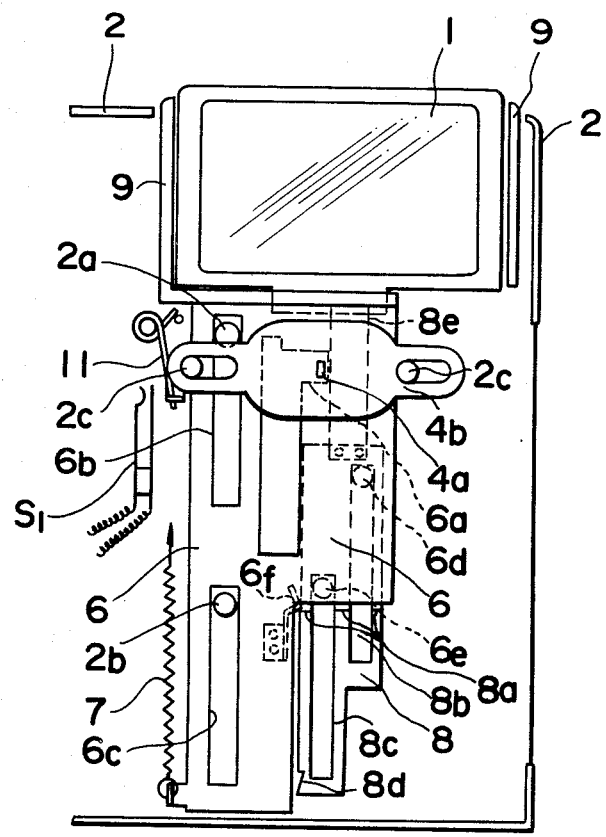
FIG. 2 is a fragmented lateral cross-sectional view of the embodiment of FIG. 1.

Referring now to the drawings, particularly FIGS. 1 to 3 thereof which illustrate a preferred embodiment of the present invention, FIG. 1 shows a camera body in a daylight photographic condition, in which the light emitting portion 1 of an electronic flash device is maintained in a retracted position within the borders of contour 2 of the camera. By pressing release button 3, the daylight photography may be performed, without the emission of light from light emitting portion 1.

For flash photography, a changeover knob 4 accessible on the camera front face is shifted in the direction of arrow 5. As a result, slide plate 4b laterally slideably guided by pins 2c secured to the camera body, as shown in FIG. 2, is slidingly moved to the left against the action of spring 11, thereby transferring main power switch S1 of the electronic flash device from its open position to its close position.

A first vertical slide plate 6 is biased or loaded to move upwards under the action of a tension spring 7, and has colinear vertical slots 6b and 6c which are slideably engaged by guide pins 2a and 2b, secured to the camera body, so that slide plate 6 may be moved in a vertical direction. A locking pin 4a is engageable with a cut-away portion 6a in plate 6, when the plate 6 is in its lowered position. The locking pin 4a is also secured to sliding plate 4b. Thus upon manipulation of the knob 4 to the left, the first slide plate 6 is released from its locked condition in its lowered, retracted position and thus moved upwards by the force of spring 7. The light emitting portion 1 of the electronic flash device is fitted in the top surface of first sliding plate 6. An open topped casing 9 is provided in a manner to house the light emitting portion 1 therein. In addition, two guide pins 6d, 6e are provided on first sliding plate 6, and resilient locking member 6f is provided along the side edge thereof.

When the first slide plate 6 has moved to its upper position, the slide plate 4b is retained at its left-hand position through the medium of pin 4a by means of the side edge of the plate, thereby maintaining main switch S1 in its closed position.

A second vertical slide plate 8 has two vertical guide slots 8b and 8c, which are slideably engaged by respective guide pins 6d and 6e secured to first slide plate 6. Second slide plate 8 may be moved up and down on the first plate 6. When second slide plate 8 is in its depressed or folded position relative to the first slide plate 6, a stepped surface or shoulder 8a of second slide plate 8 is engaged by a resilient locking member or finger 6f to restrain the second plate 8 at the lower portion thereof.

The lower side edge of second slide plate 8 is formed with cut-away or notch portion 8d which is adapted to be engaged by resilient locking member 6f, and light emitting portion 1 is mounted on the top surface of rod 8e which is secured to second sliding plate 8 and extends upwards therefrom.

Figure 3A:
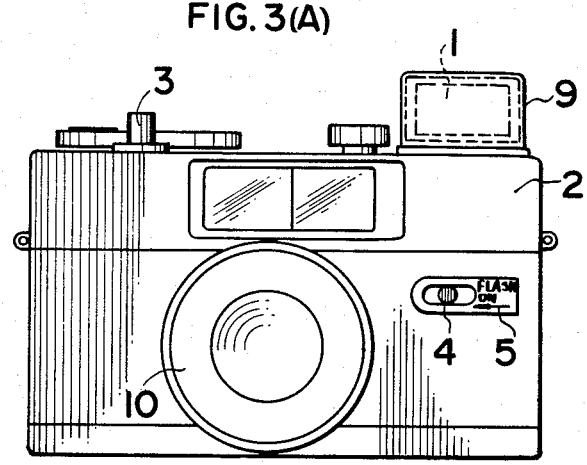

Accordingly, when first vertical slide plate 6 is released from a locked condition in its retracted position, and then spring moved to its extended position, casing 9 is moved upwards together with light emitting portion 1, which engages casing 9, so that casing 9 is extended above the contour of the camera as shown in FIG. 3A, while the light emitting portion 1 remains housed in casing 9. When the light emitting portion 1 is manually withdrawn from the position shown in FIG. 3A in a manner that the stepped surface 8a of the second slide plate 8 overcomes the force of resilient locking member 6f, then the light emitting portion 1 is upwardly extended from the casing 9 as shwon in FIG. 3(B), to its fully extended position where the cutaway portion 8d of the second slide plate 8 may engage resilient locking member 6f so as to assume its extended locked condition.

Figure 3B:
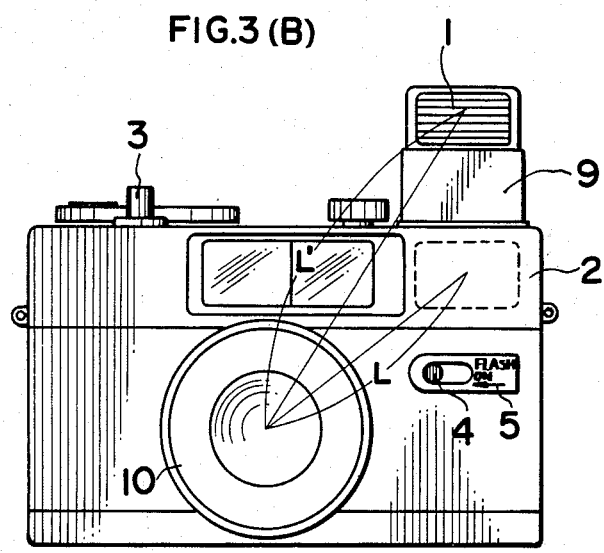

When the light emitting portion 1 is in its projecting or fully extending position, the light emitting portion 1 is spaced a considerable distance L' from the objective lens 10, as shown in FIG. 3(B), as compared with a distance L when the light emitting portion 1 remains in its retracted position, with the result that the so called "red-eye" phenomenon is obviated.

The displacement of light emitting portion 1 from its retracted position to its projecting position is achieved by the two slide plates 6 and 8, so that the sliding movement of slide plate 6 accompanies the movement of the second slide plate 8, so that there may be eventually achieved a considerable displacement of the light emitting portion, even though the displacement of each sliding plate is short. Therefore, a displacement about twice as great, in dimension, as the maximum height of the camera is available, thus providing greater freedom of design in the camera mechanism in terms of its location.

When the light emitting portion 1 is to be returned to its retracted position, the top surface of the light emitting portion 1 is simply manually depressed, so that the second slide plate 8 is shifted or folded along the first slide plate 6, and the light emitting portion 1 engages casing 9, thus causing the first slide plate 6 to be lowered to its retracted position against the action of spring 7, to a position shown in FIG. 2, whereupon pin 4a is engaged by cut-away portion 6a of the first slide plate 6, stepped surface 8a of second slide plate 8 engages resilient locking member 6f, and main switch S1 in the electronic flash device is transferred to its open position, thus allowing daylight photography.

Figure 4:
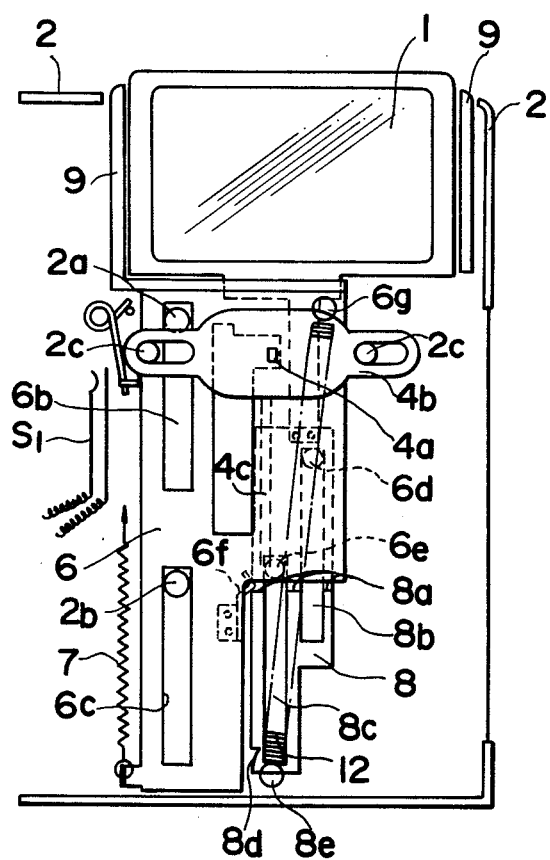
FIG. 4 is a lateral cross-sectional view of a camera according to another embodiment of the invention.

According to the embodiment shown in FIGS. 1 to 3 the light emitting portion 1 is manually withdrawn from casing 9. However, in the embodiment of FIG. 4, there is provided a tension spring 12 between upper portion 6g of first slide plate 6 and lower portion 8e of second slide plate 8, and in addition a connecting member 4c is provided for sliding plate 4 for releasing the second plate 8 from resilient locking member 6f. As a result, the leftward movement of slide plate 4b against the action of spring 11 releases first slide plate 6 from its locked retracted position, as well as second slide plate 8 from its condition locked to first sliding plate 6 by the resilient locking member 6f, with the result that first slide plate 6 and second slide plate 8 are automatically brought from their collapsed or folded position to extended position thereof under the actions of springs 7 and 12.

While there have been described and illustrated preferred embodiments of the present invention, it is apparent that numerous alterations, additions and omissions may be made without departing from the spirit thereof.

I claim:

1. In a camera including a camera body of compact size, a flash device carried by the camera body and including a light emitting portion housed in a casing which is movable between a retracted position substantially contained within said camera body, and an extended operative position in which said light emitting portion projects beyond said camera body and means for releasably retaining said light emitting portion respectively at said retracted and said extended positions, the improvement comprising:

a first elongated plate member slidable relative to said camera body from a first retracted to a second extended position;

a second elongated plate member carried on said first plate member and slidable relative to said first plate member from a first retracted to a second extended position, said second plate member being coupled at one end thereof to said casing, said first and second plate members being movable substantially in the same direction, and said casing being at its retracted position when both plate members are at their respective first positions, and at its extended position when both plate members are at their respective second positions, whereby said light emitting portion is movable a distance substantially equal to the sum of the distance of movement of said first and second plate members.

2. The camera as claimed in claim 1 further comprising a first biasing means for urging said first plate member toward its second position, means for releasably restraining said first plate member at its first position against the force of said first biasing force, and a manual member for releasing said first plate member from said restraining means.

3. The camera as claimed in claim 2 further comprising a second casing movable with said first plate member to assume, when said first plate member is at its first position, a first retracted position wherein said second casing houses said casing for said light emitting portion which is contained within the camera body, and assume, when said first plate member is at its second position, a second projected position wherein said second casing is extended above the contour of the camera body, said second casing extending between said camera body and said casing for said light emitting portion when the latter is at its extended position.

4. The camera as claimed in claim 3 wherein said first and second plate members substantially overlap one another at their, retracted positions.

5. In a camera including a camera body, a flash device carried by the camera body and having a light emitting portion, said light emitting portion being movable between a retracted position substantially contained within said camera body, and an extended operative position in which said light emitting portion projects beyond said camera body, and means for releasably retaining said light emitting portion respectively at said retracted and said extended positions, the improvement comprising:

a first member movable relative to said camera body;

a second member carried on and movable relative to and in substantially the same direction as said first member, and carrying said light emitting portion whereby said light emitting portion is movable a distance substantially equal to the sum of the distances of movement of said first and second members, said first and second members being movable respectively from first retracted to second extended positions to bring said light emitting portion from its retracted rest to its extended operative position, said light emitting portion being at its rest position when both members are at their second positions;

first biasing means for urging said first member toward its second position;

means for releasably restraining said first member at its first position;

second biasing means for urging said second member toward its second position;

means for releasably restraining said second member at its first position; and a manual member movable to release the restraint of both said first and second members.

6. A camera comprising a body member, a flash device including a light emitting section carried by said body member and longitudinally movable between a retracted position contained within said body member and an advanced position projecting from said body member, a first slide member longitudinally slidably movably mounted on said body member between advanced and retracted positions in the direction of movement of said light emitting section, a second slide member longitudinally slidably mounted on said first slide member movable relative thereto in the direction of movement of said light emitting section and coupled to said light emitting section, the total length of movement of said light emitting section being equal to the sum of the total lengths of movement of said slide members, spring means biasing said first slide member to its advanced position, and means releasably retaining said second slide member in a retracted position relative to said first slide member.

7. The camera of claim 6 including manually releaseable locking means releaseably locking said first slide member in its retracted position.

* * * * *